(12) United States Patent
Jiang et al.

(10) Patent No.: US 11,255,406 B2
(45) Date of Patent: Feb. 22, 2022

(54) MULTI-DIMENSIONAL MAGNETIC NEGATIVE-STIFFNESS MECHANISM AND MULTI-DIMENSIONAL MAGNETIC NEGATIVE-STIFFNESS VIBRATION ISOLATION SYSTEM COMPOSED THEREOF

(71) Applicant: HUAZHONG UNIVERSITY OF SCIENCE AND TECHNOLOGY, Hubei (CN)

(72) Inventors: Wei Jiang, Hubei (CN); Xuedong Chen, Hubei (CN); Jiulin Wu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/257,858

(22) PCT Filed: Oct. 17, 2019

(86) PCT No.: PCT/CN2019/111673
§ 371 (c)(1),
(2) Date: Jan. 5, 2021

(87) PCT Pub. No.: WO2020/108156
PCT Pub. Date: Jun. 4, 2020

(65) Prior Publication Data
US 2021/0293301 A1    Sep. 23, 2021

(30) Foreign Application Priority Data

Nov. 27, 2018 (CN) .......................... 201811427114.9

(51) Int. Cl.
*F16F 15/02* (2006.01)
*F16F 13/00* (2006.01)
(Continued)

(52) U.S. Cl.
CPC ............ *F16F 15/022* (2013.01); *F16F 6/005* (2013.01); *F16F 13/00* (2013.01); *F16F 13/04* (2013.01);
(Continued)

(58) Field of Classification Search
CPC .......... F16F 15/022; F16F 13/00; F16F 13/04; F16F 2222/06; F16F 2222/126; F16F 2228/001; F16F 2228/063; F16F 2232/08
See application file for complete search history.

(56) References Cited

U.S. PATENT DOCUMENTS 4,314,623 A * 2/1982 Kurokawa ............... G12B 3/00
188/267
5,319,275 A * 6/1994 Tozoni .................... B60L 13/04
104/281
(Continued)

FOREIGN PATENT DOCUMENTS

CN       102410337       4/2012
CN       102734377       10/2012
(Continued)

OTHER PUBLICATIONS

"International Search Report (Form PCT/ISA/210)" of PCT/CN2019/111673, dated Jan. 15, 2020, pp.1-5.

*Primary Examiner* — Melody M Burch
(74) *Attorney, Agent, or Firm* — JCIP Global Inc.

(57) ABSTRACT

A multi-dimensional magnetic negative-stiffness mechanism and a multi-dimensional magnetic negative-stiffness vibration isolation system composed thereof are provided. The multi-dimensional damping system is composed of a positive-stiffness mechanism, a multi-dimensional negative-stiffness mechanism, a floating frame, a vibration isolated body, and a mounting base. The positive-stiffness mechanism is a traditional elastic element connected to the vibration isolated body and the mounting base, and provides
(Continued)

supporting forces in an X direction, a Y direction, and a Z direction, and a basic vibration isolation function. The multi-dimensional negative-stiffness mechanism is composed of at least two negative-stiffness magnetic groups. Each negative-stiffness magnetic group may provide one-dimensional or two-dimensional negative stiffness. Through a series connection of the at least two negative-stiffness magnetic groups, a two-dimensional or three-dimensional negative-stiffness effect may be implemented to improve the vibration isolation performance of the system in multiple dimensions.

12 Claims, 6 Drawing Sheets

(51) Int. Cl.
*F16F 6/00* (2006.01)
*F16F 13/04* (2006.01)
*F16F 15/03* (2006.01)
*F16F 15/023* (2006.01)
*F16F 15/04* (2006.01)
*F16F 15/06* (2006.01)
*F16F 15/08* (2006.01)

(52) U.S. Cl.
CPC .......... *F16F 15/03* (2013.01); *F16F 15/0232* (2013.01); *F16F 15/046* (2013.01); *F16F 15/06* (2013.01); *F16F 15/08* (2013.01); *F16F 15/085* (2013.01); *F16F 2222/06* (2013.01); *F16F 2222/126* (2013.01); *F16F 2228/001* (2013.01); *F16F 2228/063* (2013.01); *F16F 2232/08* (2013.01)

(56) References Cited

U.S. PATENT DOCUMENTS

| | | | | |
|---|---|---|---|---|
| 5,445,249 A | * | 8/1995 | Aida | F16F 7/10 188/267 |
| 6,505,718 B2 | * | 1/2003 | Fujita | F16F 3/026 188/267 |
| 7,290,642 B2 | * | 11/2007 | Heiland | F16F 6/00 188/267 |
| 2017/0045107 A1 | * | 2/2017 | Chen | F16F 6/005 |

FOREIGN PATENT DOCUMENTS

| | | |
|---|---|---|
| CN | 102808883 | 12/2012 |
| CN | 103256332 | 8/2013 |
| CN | 106321719 | 1/2017 |
| CN | 109356962 | 2/2019 |
| JP | 4157393 | 10/2008 |
| KR | 20120093014 | 8/2012 |

\* cited by examiner

MULTI-DIMENSIONAL MAGNETIC NEGATIVE-STIFFNESS MECHANISM AND MULTI-DIMENSIONAL MAGNETIC NEGATIVE-STIFFNESS VIBRATION ISOLATION SYSTEM COMPOSED THEREOF

CROSS-REFERENCE TO RELATED APPLICATION

This application is a 371 of international application of PCT application serial no. PCT/CN2019/111673, filed on Oct. 17, 2019, which claims the priority benefit of China application no. 201811427114.9, filed on Nov. 27, 2018. The entirety of each of the above mentioned patent applications is hereby incorporated by reference herein and made a part of this specification.

BACKGROUND

Technical Field

The disclosure relates to the field of vibration isolation, and more specifically relates to a multi-dimensional magnetic negative-stiffness mechanism and a multi-dimensional vibration isolation system composed thereof.

Description of Related Art

Vibration problems generally exist in various fields of industrial production and engineering. As various mechanical equipment develops toward high speed, high precision, and high stability, the requirements for vibration become more and more stringent. It is necessary to use a shock absorber to isolate the transmission of the vibration from the equipment to the fixed support thereof, or to use a shock absorber to isolate the transmission of vibration from the mechanical structure to related equipment.

The performance of the shock absorber mainly includes bearing performance and vibration isolation performance. Traditional forms of shock absorbers, such as metal springs, rubber structures, metal-rubber composite structures, gas springs, etc., have the problem of contradiction between bearing performance and vibration isolation performance, which is mainly reflected in that when the stiffness of the system is reduced to improve the vibration isolation performance of the system, the bearing performance of the system is reduced. Currently, a better solution is to introduce a magnetic negative-stiffness mechanism into the vibration isolation system, which has the following main advantages:

1) the vibration isolation performance of the system is improved while ensuring that the bearing performance of the system is not decreased; and 2) the magnetic field force is a non-contact force, which will not introduce friction and the nonlinear problem caused by friction.

However, the current application of magnetic negative-stiffness technology in the field of vibration isolation still has some technical difficulties. For example, it is difficult to implement larger negative stiffness, it is difficult to implement stable linear negative stiffness, it is difficult to implement multi-dimensional negative stiffness, etc., which limit the application of magnetic negative-stiffness technology in the vibration isolation system. In view of the technical difficulty of being difficult to implement multi-dimensional negative stiffness, there is a need to develop a multi-dimensional magnetic negative-stiffness mechanism in the field of vibration isolation.

SUMMARY

In view of the defects or improvement requirements of the prior art, the disclosure provides a multi-dimensional magnetic negative-stiffness mechanism constructed using permanent magnets, which integrates magnetic negative-stiffness mechanisms in different directions through a floating structure, combines the setting of stiffness values to generate three-dimensional negative stiffness or two-dimensional negative stiffness, and provides a multi-dimensional vibration isolation system based thereon. A three-dimensional design of a positive-stiffness mechanism is combined to implement multi-dimensional series-parallel composite vibration isolation of positive stiffness and negative stiffness, thereby improve the vibration isolation performance of the system in multiple dimensions under various working conditions, while ensuring the bearing capacity and improving the comprehensive performance of the vibration isolation system.

In order to achieve the above objective, according to one aspect of the disclosure, a multi-dimensional magnetic negative-stiffness mechanism is provided, which includes a mounting base, a floating frame, a two-dimensional magnetic negative-stiffness unit, and a one-dimensional magnetic negative-stiffness unit.

The two-dimensional magnetic negative-stiffness unit includes at least one two-dimensional negative-stiffness magnetic group, and the one-dimensional magnetic negative-stiffness unit includes at least one one-dimensional negative-stiffness magnetic group.

The floating frame includes a linear guide rail and a permanent magnet mounting frame. The permanent magnet mounting frame makes one-dimensional linear movement along the linear guide rail. A three-dimensional rectangular coordinate system OXYZ is established with a main bearing direction as a Z direction. The linear guide rail is arranged along the Z direction. Two negative-stiffness directions of the two-dimensional negative-stiffness magnetic group are respectively arranged along an X direction and a Y direction. A negative-stiffness direction of the one-dimensional negative-stiffness magnetic group is arranged along the Z direction.

The two-dimensional negative-stiffness magnetic group includes two two-dimensional moving magnets linearly arranged along the Z direction and a two-dimensional fixed magnet located therebetween. The two-dimensional fixed magnet and the two-dimensional moving magnets are all magnetized along the Z direction. Magnetizing directions of the two two-dimensional moving magnets fixed magnets are the same and are opposite to a magnetizing direction of the two-dimensional fixed magnet.

The one-dimensional negative-stiffness magnetic group includes two one-dimensional fixed magnets linearly arranged perpendicular to the Z direction and a one-dimensional moving magnet located therebetween.

The linear guide rail and the two one-dimensional fixed magnets are all fixed onto the mounting base, and the two two-dimensional moving magnets are both fixed onto a vibration isolated body. Alternatively, the linear guide rail and the two one-dimensional fixed magnets are all fixed onto the vibration isolated body, and the two two-dimensional moving magnets are both fixed onto the mounting base.

The one-dimensional moving magnet and the two-dimensional fixed magnet are both fixed onto the permanent magnet mounting frame to make one-dimensional linear movement in the Z direction along the linear guide rail along with the permanent magnet mounting frame.

An equivalent stiffness $K_Z$ of the entire multi-dimensional magnetic negative-stiffness mechanism in the Z direction satisfies the following relationship:

$$k_z = \frac{k_{ZZ} k_{ZF}}{k_{ZZ} + k_{ZF}}$$

where $K_{ZZ}$ is the positive stiffness generated by the two-dimensional magnetic negative-stiffness unit in the Z direction, and $K_{ZF}$ is the negative stiffness generated by the one-dimensional magnetic negative-stiffness unit in the Z direction.

When $K_{ZF}<0<-K_{ZF}<K_{ZZ}$, $K_Z<0$, and the entire multi-dimensional magnetic negative-stiffness mechanism is a three-dimensional magnetic negative-stiffness mechanism.

When $K_{ZF}<0<K_{ZZ}\leq -K_{ZF}$, $K_Z\geq 0$, and the entire multi-dimensional magnetic negative-stiffness mechanism is a two-dimensional magnetic negative-stiffness mechanism in the X direction and the Y direction.

Further, two two-dimensional negative-stiffness magnetic groups and a one-dimensional negative-stiffness magnetic group are included. The two two-dimensional negative-stiffness magnetic groups are distributed on two sides of the one-dimensional negative-stiffness magnetic group along the X direction or the Y direction.

Further, a two-dimensional negative-stiffness magnetic group and two one-dimensional negative-stiffness magnetic groups are included. The two one-dimensional negative-stiffness magnetic groups are distributed on two sides of the two-dimensional negative-stiffness magnetic group along the X direction or the Y direction.

Further, the one-dimensional fixed magnets and the one-dimensional moving magnet are all formed by stacking multiple magnets, and in the magnets stacked on top of each other, magnetizing directions of adjacent magnets are opposite. Magnetizing directions of magnets on the same layer of the two one-dimensional fixed magnets are the same and are opposite to magnetizing directions of magnets on the same layer of the one-dimensional moving magnet.

Further, the magnets for stacking in the one-dimensional negative-stiffness magnetic group are all long rectangular bodies with square cross sections.

In order to achieve the above objective, on the other aspect, the disclosure also provides a multi-dimensional magnetic negative-stiffness vibration isolation system, which includes a positive-stiffness mechanism and the multi-dimensional magnetic negative-stiffness mechanism according to above.

The positive-stiffness mechanism includes an X-direction positive-stiffness component, a Z-direction positive-stiffness component, and a Y-direction positive-stiffness component, which are respectively supported between a vibration isolated body and a mounting base along an X-direction, a Z-direction, and a Y-direction.

Further, the X-direction positive-stiffness component, the Z-direction positive-stiffness component, and the Y-direction positive-stiffness component respectively include any one or more of a metal spring, a rubber structure, a metal-rubber composite structure, and a gas spring.

Further, the Z-direction positive-stiffness component includes four Z-direction coil springs, which are symmetrically distributed at four corners between the vibration isolated body and the mounting base.

Further, the X-direction positive-stiffness component includes two X-direction coil springs, which are symmetrically distributed along the X-direction on two sides of a vibration isolated object, and are fixedly connected onto the mounting base through an X-direction mounting column.

Further, the Y-direction positive-stiffness component includes two Y-direction coil springs, which are symmetrically distributed along the Y-direction on two sides of the vibration isolated object, and are fixedly connected onto the mounting base through a Y-direction mounting column.

In general, compared with the prior art, the above technical solutions conceived by the disclosure can achieve the following beneficial effects:

1. The multi-dimensional magnetic negative-stiffness mechanism provided by the disclosure is set through the association relationship between at least one one-dimensional negative-stiffness magnetic group and at least one two-dimensional negative-stiffness magnetic group to implement the series connection of negative stiffness and positive stiffness in the Z direction, thereby being capable of combining the selection of positive-stiffness and negative-stiffness values in the Z direction, so as to implement negative-stiffness characteristics in three directions or two directions. The multi-dimensional vibration isolation system composed of the multi-dimensional magnetic negative-stiffness mechanism and positive-stiffness mechanism implements the parallel connection of negative stiffness and positive stiffness in multiple directions to adapt to various vibration isolation environments.

2. The disclosure implements multi-dimensional magnetic negative stiffness, so that the vibration isolation effect of the vibration isolation system in multiple dimensions is significantly improved. The vibration isolation performance of the vibration isolation system is improved while ensuring that the bearing capacity of the system does not decrease.

3. In the multi-dimensional magnetic negative-stiffness mechanism of the disclosure, negative stiffness is implemented through non-contact magnetic field force without friction, which prevents the nonlinear problem caused by friction, is simple and convenient, is easy to apply to traditional shock absorbers, and satisfies various actual engineering requirements.

4. In the disclosure, the permanent magnets in contact with each other are all attractive, which improves the negative-stiffness value, is convenient and safe to mount, does not need bonding, and has a compact structure, lighter weight, simple processing, and lower cost.

5. The two-dimensional negative-stiffness magnetic groups are set as two pairs, symmetrically arranged on two sides of the one-dimensional negative-stiffness magnetic group to achieve a balanced and stable effect. The floating frame and the mounting base (or the vibration isolated body) are connected with the linear guide rail. The relative movement in the Z direction may be implemented between the floating frame and the mounting base (or the vibration isolated body), while there cannot be any relative movement in the X direction and the Y direction, thereby obtaining the one-dimensional negative-stiffness magnetic group, which can improve the stability of the system, and is easy to mount and maintain.

6. The one-dimensional negative-stiffness magnetic group selects a moving magnet to be placed between two fixed magnets, which are linearly and evenly arranged in the X direction, and are mutually repulsive, which can increase the negative-stiffness stroke and reduce the risk of collision between the magnets.

7. The permanent magnets of the one-dimensional negative-stiffness magnetic group may be set as long rectangular bodies with square cross sections, which can increase the negative-stiffness value in the Z direction while reducing the positive-stiffness value in the Y direction to improve the vibration isolation performance of the system. In addition, the one-dimensional negative-stiffness magnetic group may also be set as a Z-direction multilayer stack to form a rectangular array structure, which can also increase the negative-stiffness value in the Z-direction to improve the vibration isolation performance of the system.

8. The positive-stiffness mechanism may select four coil springs in the Z direction, two coil springs in the X direction, and two coil springs in the Y direction, which are easy to install and can improve the stability of the system.

DETAILED DESCRIPTION OF DISCLOSED EMBODIMENTS

For the objective, technical solutions, and advantages of the disclosure to be clearer, the disclosure is further described in detail below with reference to the accompanying drawings and the embodiments. It should be understood that the specific embodiments described here are only used to explain the disclosure, but not to limit the disclosure. The coordinate system and directions established in the disclosure are only used to describe the relative relationship between the structures, so as to better understand the disclosure, rather than as specific limitations to the disclosure. In addition, the technical features involved in the various embodiments of the disclosure described below may be combined with each other as long as there is no conflict therebetween.

Figure 1:
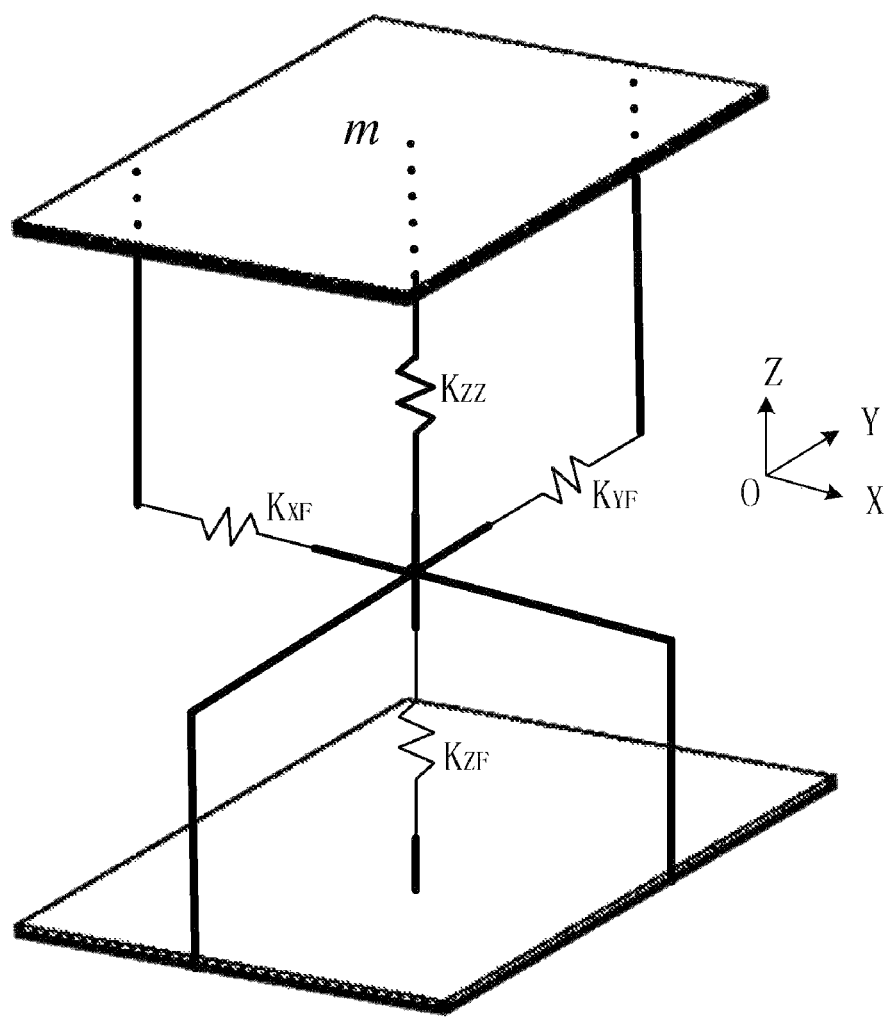
FIG. 1 is a principle diagram of the disclosure.

Please refer to FIGS. 1 to 3, the basic working principle of the disclosure is as follows:

In the multi-dimensional magnetic negative-stiffness mechanism, the negative-stiffness direction of a one-dimensional negative-stiffness magnetic group 5 coincides with a main bearing direction, a Z direction, of the vibration isolation system, and the two negative-stiffness directions of a two-dimensional negative-stiffness magnetic group 6 coincide with an X direction and a Y direction of the vibration isolation system.

When a vibration isolated body 3 (or a mounting base 1) vibrates due to external or internal reasons, there will be relative displacements between the vibration isolated body 3 (or the mounting base 1) and a floating frame 4, and the floating frame 4 and the mounting base 1 (or the vibration isolated body 3), which cause a relative displacement between the moving magnet and the fixed magnet, thereby causing the interactive magnetic force between the two to change.

The magnetic force-displacement characteristics of the one-dimensional negative stiffness magnetic group 5 are that in the negative-stiffness direction, the Z direction, of the one-dimensional negative-stiffness magnetic group 5, the magnetic force between a one-dimensional moving magnet 51 and a one-dimensional fixed magnet 52 increases as the relative displacement between the magnets in the Z direction increases, which generates a Z-direction negative-stiffness characteristic $K_{ZF}$; and in the X direction and the Y direction due to the limitation of a linear guide rail 41 and a floating frame 42, there cannot be any relative movement between the one-dimensional moving magnet 51 and the one-dimensional fixed magnet 52, so there is no positive-stiffness characteristic and negative-stiffness characteristic in the corresponding directions.

The magnetic force-displacement characteristics of the two-dimensional negative-stiffness magnetic group 6 are that in the Z direction, the magnetic force between a two-dimensional moving magnet 61 and a two-dimensional fixed magnet 62 decreases as the relative displacement between the magnets in the Z direction increases, which generates a Z-direction positive-stiffness characteristic $K_{ZZ}$, thereby forming a series relationship with the Z-direction negative-stiffness characteristic $K_{ZF}$ of the one-dimensional negative-stiffness magnetic group 5 in the Z direction. In the X direction, the magnetic force between the two-dimensional moving magnet 61 and the two-dimensional fixed magnet 62 increases as the relative displacement between the magnets in the X direction increases, which generates a negative-stiffness characteristic $K_{xF}$. In the Y direction, the magnetic force between the two-dimensional moving magnet 61 and the two-dimensional fixed magnet 62 increases as the relative displacement between the magnets in the Y direction increases, which generates a negative-stiffness characteristic $K_{YF}$.

For the multi-dimensional magnetic negative-stiffness mechanism, there are the positive-stiffness characteristic $K_{ZZ}$ and the negative-stiffness characteristic $K_{ZF}$ in the Z direction, one of which acts between the vibration isolated body 3 (or the mounting base 1) and the floating frame 4, and the other acts between the floating frame 4 and the mounting base 1 (or the vibration isolated body 3). Therefore, a stiffness characteristic $K_Z$ in the Z-direction between the mounting base 1 and the vibration isolated body 3 is the series connection of the two, according to a stiffness series connection formula:

$$k_z = \frac{k_{ZZ} k_{ZF}}{k_{ZZ} + k_{ZF}}$$

When $K_{ZF}<0<-K_{ZF}<K_{ZZ}$, $K_Z<0$. Therefore, appropriately matching the values of $K_{ZF}$ of the one-dimensional negative-stiffness magnetic group and $K_{ZZ}$ of the two-dimensional negative-stiffness magnetic group enables the stiffness characteristic $K_Z$ between the mounting base and the vibration isolated body to be less than 0. Also, since the X and Y directions are limited by the floating frame 4, there is no positive stiffness, so that the mechanism implements three-dimensional negative stiffness. When $K_{ZF}<0<K_{ZZ}\leq-K_{ZF}$, $K_Z\geq0$, the multi-dimensional magnetic negative-stiffness mechanism implements two-dimensional negative stiffness in the X direction and the Y direction.

The disclosure will be further described below in conjunction with several specific embodiments.

Embodiment 1

Figure 2:
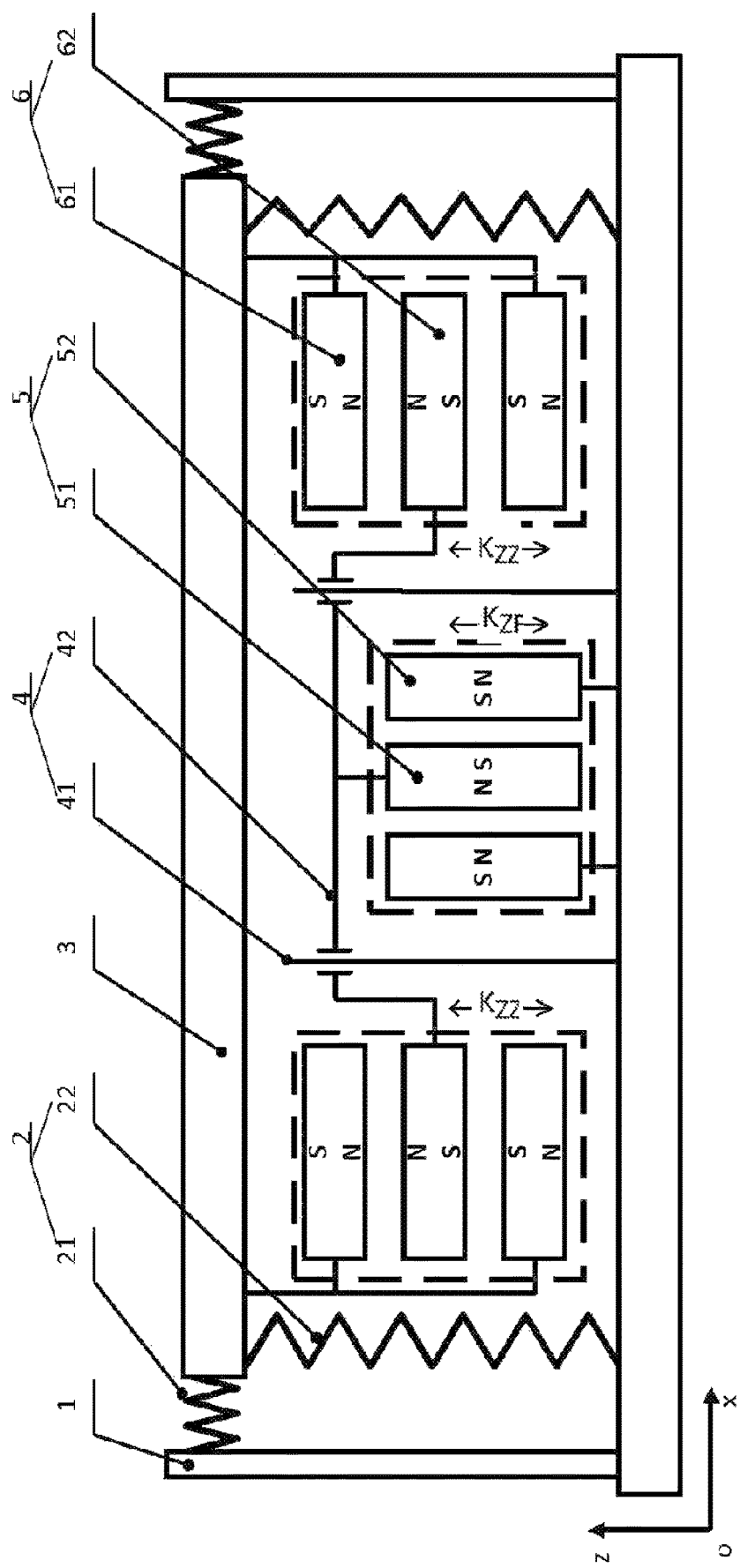
FIG. 2 is a front view of a multi-dimensional magnetic negative-stiffness mechanism and a vibration isolation system composed thereof according to Embodiment 1 of the disclosure.
Figure 3:
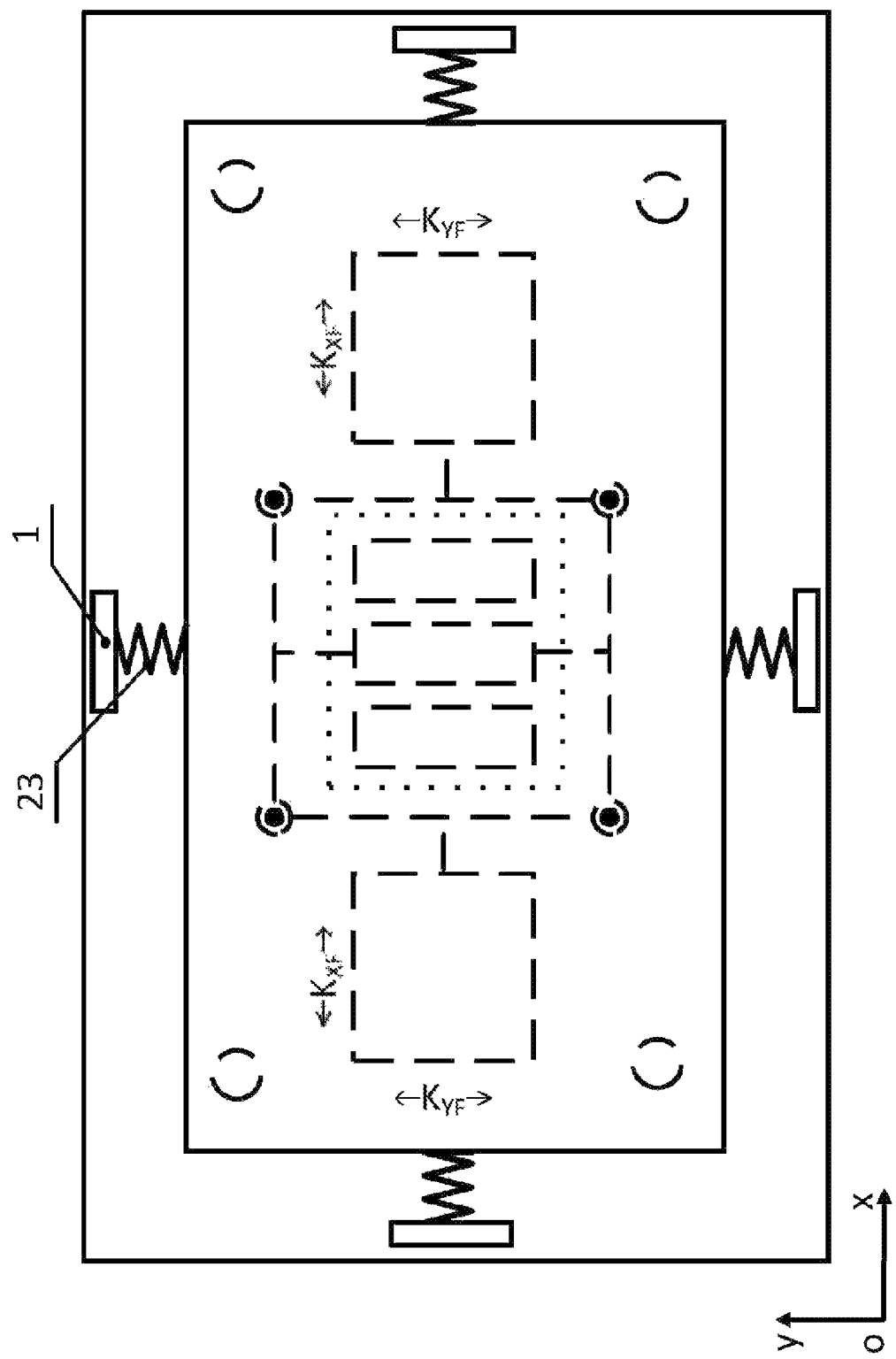
FIG. 3 is a top view of the multi-dimensional magnetic negative-stiffness mechanism and the vibration isolation system composed thereof according to Embodiment 1 of the disclosure.

Please refer to FIGS. 2 and 3. A multi-dimensional magnetic negative-stiffness mechanism and a multi-dimensional vibration isolation system composed thereof according to Embodiment 1 include a mounting base 1, a positive-stiffness mechanism 2, a vibration isolated body 3, a floating frame 4, a one-dimensional negative-stiffness magnetic group 5, and a two-dimensional negative-stiffness magnetic group 6. In FIG. 2, to facilitate the understanding of the magnetic negative-stiffness direction, the two two-dimensional negative-stiffness magnetic groups 6 are both marked $K_{ZZ}$. Actually, $K_{ZZ}$ is the overall positive stiffness of the entire two-dimensional magnetic negative-stiffness unit in the Z direction. The markings of stiffness in the other drawings may be deduced by analogy, so there will be no reiteration.

The mounting base 1 is fixedly connected to a foundation or a basic structure, which may be a vibration input end, a vibration source, or a vibration output end. The vibration isolated body 3 is a vibration isolated equipment, platform, etc., which may be a vibration output end, a vibration input end, or a vibration source.

The floating frame 4 is configured to fix a moving permanent magnet, and includes a linear guide rail 41 and a permanent magnet mounting frame 42. Four linear guide rails 41 are fixedly connected to the mounting base 1, and the direction of the linear guide rails is the main bearing direction, the Z direction, of the vibration isolation system, which is perpendicular to the plane of the mounting base. Four linear bearings are mounted on the permanent magnet mounting frame 42 to respectively cooperate with the four linear guide rails 41, so that the permanent magnet mounting frame can only move in the Z direction.

The positive-stiffness mechanism 2 includes an X-direction spring 21, a Z-direction spring 22, and a Y-direction spring 23. Four Z-direction springs 23 are arranged along the Z direction, and the two ends are respectively connected to the mounting base 1 and the vibration isolated body 3, so as to form positive-stiffness support in the Z-direction. There are four columns on the mounting base 1 for fixing the springs. The X-direction springs 21 are arranged along the X direction, and the two ends are respectively connected to the mounting base 1 and the vibration isolated body 3. There are two X-direction springs 21, which are symmetrically arranged on two sides of the vibration isolated body 3 to provide positive stiffness in the X direction. The Y-direction springs 23 are arranged along the Y direction, and the two ends are respectively connected to the mounting base 1 and the vibration isolated body 3. There are two Y-direction springs 23, which are symmetrically arranged on two sides of the vibration isolated body 3 to provide positive stiffness in the Y direction.

The one-dimensional negative-stiffness magnetic group 5 includes a vertical negative-stiffness magnetic group moving magnet 51 and a vertical negative-stiffness magnetic group fixed magnet 52. The vertical negative-stiffness magnetic group moving magnet 51 is fixedly connected to the permanent magnet mounting frame 42. The vertical negative-stiffness magnetic group fixed magnet 52 is two permanent magnets, which are symmetrically distributed on two sides of the vertical negative-stiffness magnetic group moving magnet 51, and are fixedly connected to the mounting base 1. The three permanent magnets are evenly arranged along the X direction, and the magnetizing directions are all in the X direction. The magnetizing directions between adjacent permanent magnets are opposite to form a repulsive force, so as to constitute the one-dimensional negative-stiffness magnetic group, and provide negative stiffness in the Z-direction.

The two-dimensional negative-stiffness magnetic group 6 includes two groups of magnets, which are symmetrically arranged on two sides of the one-dimensional negative-stiffness magnetic group. Each group of magnets includes a two-dimensional negative-stiffness magnetic group fixed magnet 62 and a two-dimensional negative-stiffness magnetic group moving magnet 61. The two-dimensional negative-stiffness magnetic group fixed magnet 62 is fixedly connected to the permanent magnet mounting frame 42. Two two-dimensional negative-stiffness magnetic group moving magnets 61 on the same side are fixedly connected to the vibration isolated body 3 and are symmetrically arranged on the upper and lower sides of the two-dimensional negative-stiffness magnetic group moving fixed magnet 62. The three permanent magnets are linearly and evenly arranged along the Z-direction, and the magnetizing directions are all the same in the Z-direction, which forms an attractive force, and provides negative stiffness in the X direction and the Y direction. The positive stiffness in the Z direction formed by the two-dimensional negative-stiffness magnetic group 6 is connected in series with the negative stiffness formed by the one-dimensional negative-stiffness magnetic group 5 to form negative stiffness in the Z direction between the vibration isolated body 3 and the mounting base 1.

Embodiment 2

Figure 4:
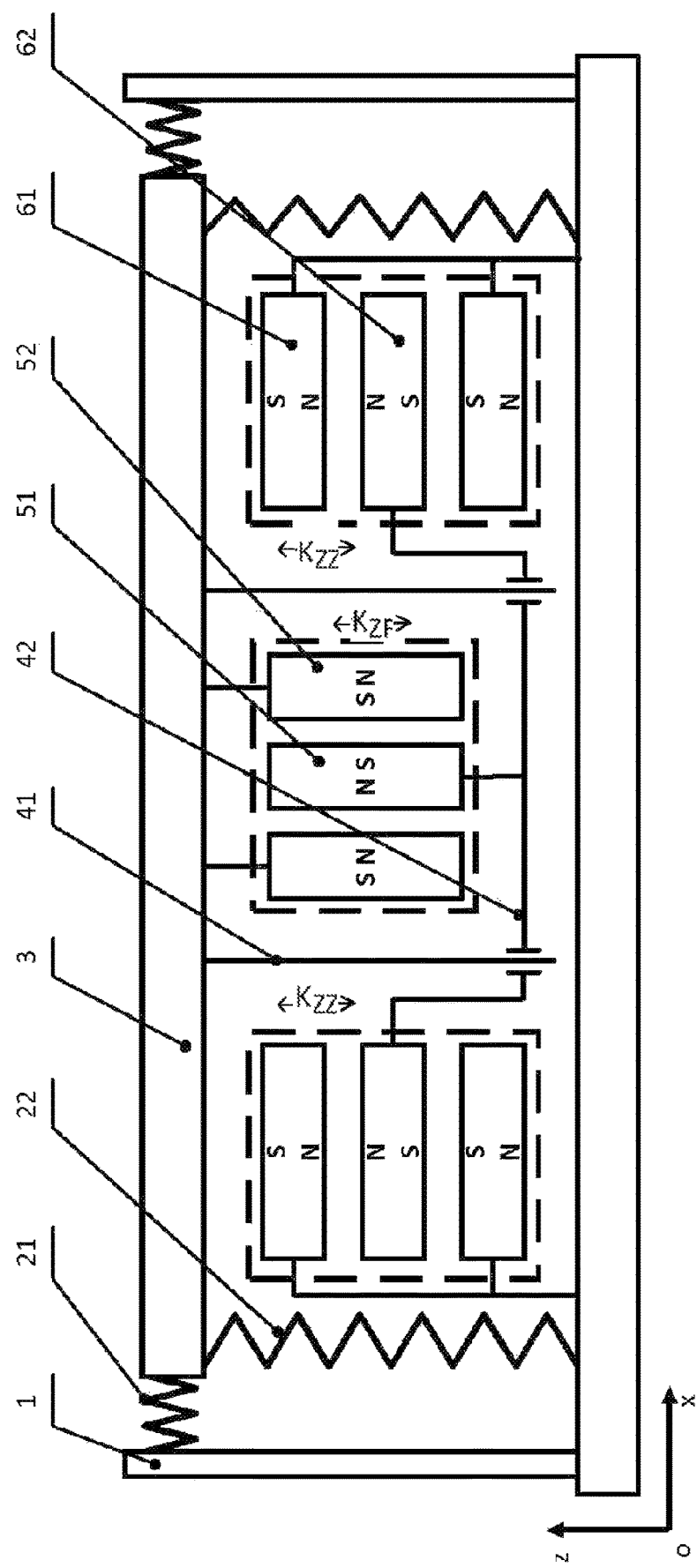
FIG. 4 is a front view of a multi-dimensional magnetic negative-stiffness mechanism and a vibration isolation system composed thereof according to Embodiment 2 of the disclosure.

Please refer to FIG. 4. Embodiment 2 of the disclosure differs from Embodiment 1 in that the one-dimensional fixed magnet 52 and the linear guide rail 41 are fixedly connected to the vibration isolated body 3, and the two-dimensional negative-stiffness magnetic group moving magnet 61 is fixedly connected to the mounting base 1.

Embodiment 3

Figure 5:
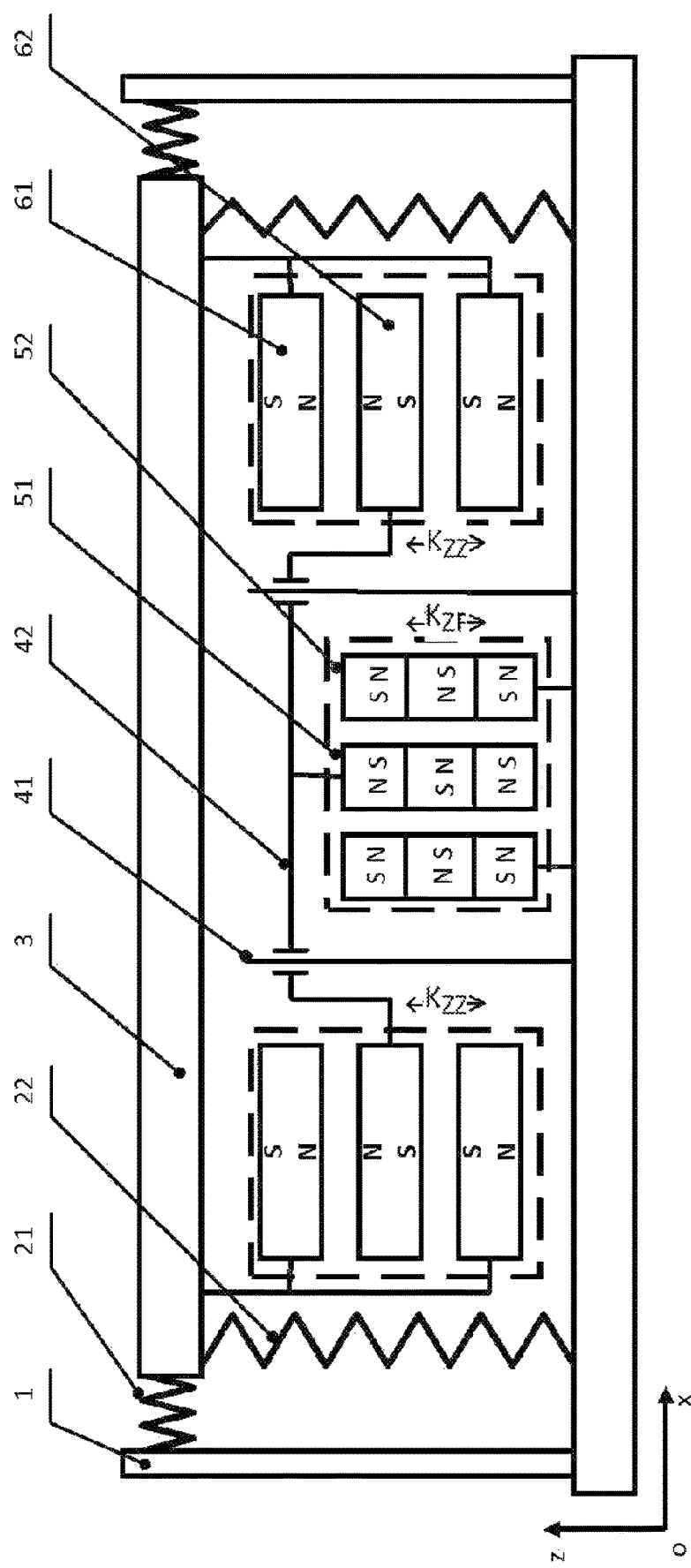
FIG. 5 is a front view of a multi-dimensional magnetic negative-stiffness mechanism and a vibration isolation system composed thereof according to Embodiment 3 of the disclosure.

Please refer to FIG. 5. Embodiment 3 of the disclosure differs from Embodiment 1 in that the one-dimensional fixed magnet 52 and the one-dimensional moving magnet 51 are both composed of three-layered bar magnets with square cross sections, and magnetizing directions of all magnets are in the same X direction, but magnetizing directions of adjacent magnets in the same row or in the same column are opposite. This embodiment can increase negative stiffness in the Z direction to improve the vibration isolation performance of the system in the Z direction.

Embodiment 4

Figure 6:
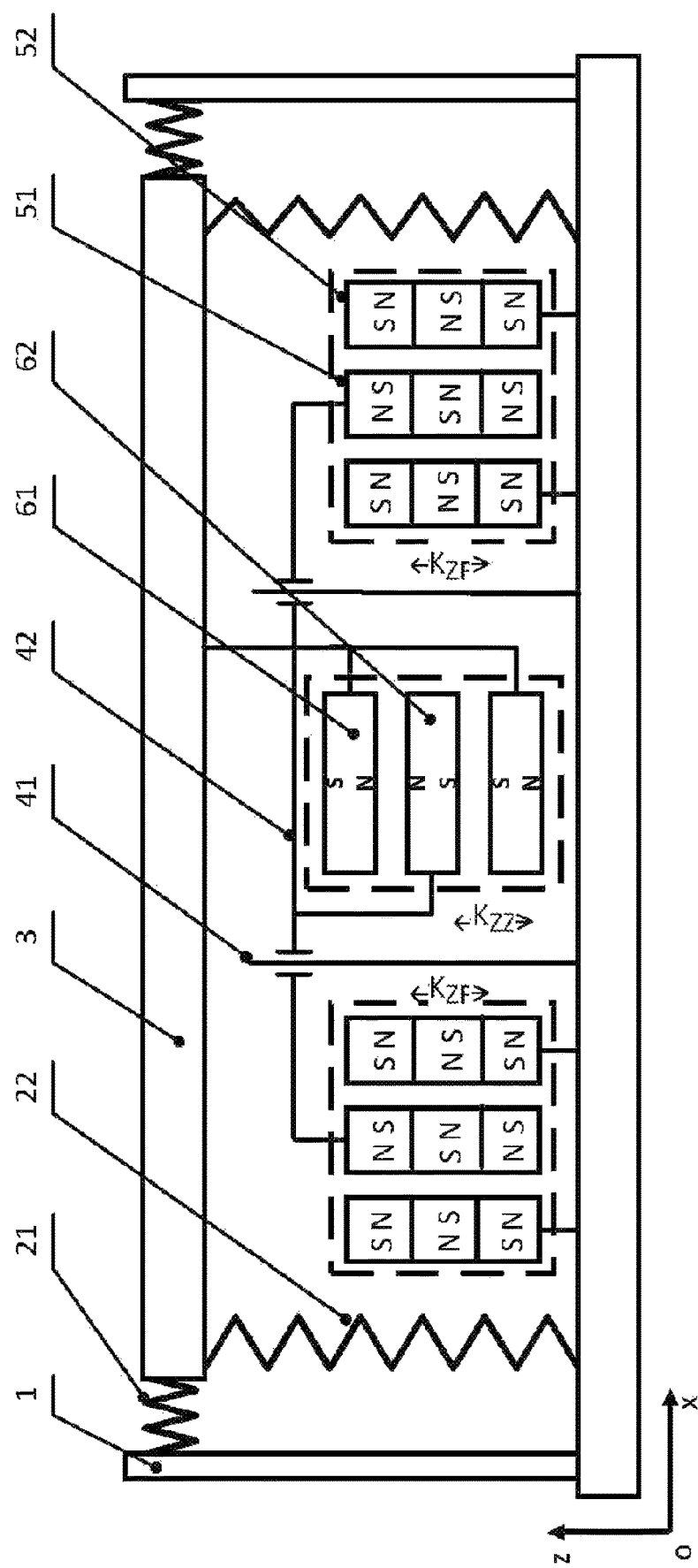
FIG. 6 is a front view of a multi-dimensional magnetic negative-stiffness mechanism and a vibration isolation system composed thereof according to Embodiment 4 of the disclosure.

Please refer to FIG. 6. Embodiment 4 of the disclosure differs from Embodiment 3 in that two one-dimensional negative-stiffness magnetic groups 5 are adopted, which are symmetrically arranged on two sides of a two-dimensional negative-stiffness magnetic group 6.

In another embodiment (not shown), since the one-dimensional negative-stiffness magnetic group 5 can only make one-dimensional linear movement along the Z direction, the one-dimensional negative-stiffness magnetic group 5 does not need to be magnetized in the X direction as in Embodiments 1 to 4. In fact, the one-dimensional negative-stiffness magnetic group 5 may be magnetized in any straight line on the XY plane, that is, perpendicular to the Z direction.

In another embodiment (not shown), the linear guide rail 41 may also include only two linear guide sleeves, or only one linear slide block is required, as long as one-dimensional linear movement can be implemented.

Persons skilled in the art may easily understand that the above are only the preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A multi-dimensional magnetic negative-stiffness mechanism, comprising: a mounting base, a floating frame, a two-dimensional magnetic negative-stiffness unit, and a one-dimensional magnetic negative-stiffness unit, wherein the two-dimensional magnetic negative-stiffness unit comprises a two-dimensional negative-stiffness magnetic group, and the one-dimensional magnetic negative-stiffness unit comprises a one-dimensional negative-stiffness magnetic group;

the floating frame comprises a linear guide rail and a permanent magnet mounting frame; the permanent magnet mounting frame makes one-dimensional linear movement along the linear guide rail; a three-dimensional rectangular coordinate system OXYZ is established with a main bearing direction as a Z direction, the linear guide rail is arranged along the Z direction, two negative-stiffness directions of the two-dimensional negative-stiffness magnetic group are respectively arranged along an X direction and a Y direction, and a negative-stiffness direction of the one-dimensional negative-stiffness magnetic group is arranged along the Z direction;

the two-dimensional negative-stiffness magnetic group comprises two two-dimensional moving magnets linearly arranged along the Z direction and a two-dimensional fixed magnet located between the two-dimensional moving magnets; the two-dimensional fixed magnet and the two-dimensional moving magnets are all magnetized along the Z direction, and magnetizing directions of the two two-dimensional moving magnets are the same and are opposite to a magnetizing direction of the two-dimensional fixed magnet;

the one-dimensional negative-stiffness magnetic group comprises two one-dimensional fixed magnets linearly arranged perpendicular to the Z direction and a one-dimensional moving magnet located therebetween;

the linear guide rail and the two one-dimensional fixed magnets are all fixed onto the mounting base, and the two two-dimensional moving magnets are both fixed onto a vibration isolated body; alternatively, the linear guide rail and the two one-dimensional fixed magnets are all fixed onto the vibration isolated body, and the two two-dimensional moving magnets are both fixed onto the mounting base;

the one-dimensional moving magnet and the two-dimensional fixed magnet are both fixed onto the permanent magnet mounting frame to make one-dimensional linear movement in the Z direction along the linear guide rail along with the permanent magnet mounting frame;

an equivalent stiffness $K_Z$ of entire multi-dimensional magnetic negative-stiffness mechanism n the Z direction satisfies a following relationship:

$$k_z = \frac{k_{ZZ}k_{ZF}}{k_{ZZ} + k_{ZF}}$$

where $K_{ZZ}$ is positive stiffness generated by the two-dimensional magnetic negative-stiffness unit in the Z direction, and $K_{ZF}$ is negative stiffness generated by the one-dimensional magnetic negative-stiffness unit in the Z direction;

When $K_{ZF}<0<-K_{ZF}<K_{ZZ}$, $K_Z<0$, and the entire multi-dimensional magnetic negative-stiffness mechanism is a three-dimensional magnetic negative-stiffness mechanism; and when $K_{ZF}<0<K_{ZZ}\le-K_{ZF}$, $K_Z\ge0$, and the entire multi-dimensional magnetic negative-stiffness mechanism is a two-dimensional magnetic negative-stiffness mechanism in the X direction and the Y direction.

2. The multi-dimensional magnetic negative-stiffness mechanism according to claim 1, wherein the two-dimensional negative-stiffness magnetic group comprises two two-dimensional negative-stiffness magnetic groups, the one-dimensional negative-stiffness magnetic group comprises one one-dimensional negative-stiffness magnetic group, and the two two-dimensional negative-stiffness magnetic groups are distributed on two sides of the one-dimensional negative-stiffness magnetic group along the X direction or the Y direction.

3. The multi-dimensional magnetic negative-stiffness mechanism according to claim 1, wherein the two-dimensional negative-stiffness magnetic group comprises one two-dimensional negative-stiffness magnetic group, the one-dimensional negative-stiffness magnetic group comprises two one-dimensional negative-stiffness magnetic groups, and the two one-dimensional negative-stiffness magnetic groups are distributed on two sides of the two-dimensional negative-stiffness magnetic group along the X direction or the Y direction.

4. The multi-dimensional magnetic negative-stiffness mechanism according to claim 1, wherein the one-dimensional fixed magnets and the one-dimensional moving magnet are all formed by stacking a plurality of magnets, and in the magnets stacked on top of each other, magnetizing directions of adjacent magnets are opposite; and magnetizing directions of magnets on a same layer of two one-dimensional fixed magnets are the same and are opposite to magnetizing directions of magnets on a same layer of the one-dimensional moving magnet.

5. The multi-dimensional magnetic negative-stiffness mechanism according to claim 4, wherein magnets for stacking in the one-dimensional negative-stiffness magnetic group are all long rectangular bodies with square cross sections.

6. A multi-dimensional magnetic negative-stiffness vibration isolation system, comprising: a positive-stiffness mechanism and the multi-dimensional magnetic negative-stiffness mechanism according to claim 1, wherein the positive-stiffness mechanism comprises an X-direction positive-stiffness component, a Z-direction positive-stiffness component, and a Y-direction positive-stiffness component, which are respectively supported between the vibration isolated body and the mounting base along an X-direction, a Z-direction, and a Y-direction.

7. The multi-dimensional magnetic negative-stiffness vibration isolation system according to claim 6, wherein the X-direction positive-stiffness component, the Z-direction positive-stiffness component, and the Y-direction positive-stiffness component respectively comprise any one or more of a metal spring, a rubber structure, a metal-rubber composite structure, and a gas spring.

8. The multi-dimensional magnetic negative-stiffness vibration isolation system according to claim 7, wherein the Z-direction positive-stiffness component comprises four Z-direction coil springs, which are symmetrically distributed at four corners between the vibration isolated body and the mounting base.

9. The multi-dimensional magnetic negative-stiffness vibration isolation system according to claim 7, wherein the X-direction positive-stiffness component comprises two X-direction coil springs, which are symmetrically distributed along the X-direction on two sides of the vibration isolated object, and are fixedly connected onto the mounting base through an X-direction mounting column.

10. The multi-dimensional magnetic negative-stiffness vibration isolation system according to claim 7, wherein the Y-direction positive-stiffness component comprises two Y-direction coil springs, which are symmetrically distributed along the Y-direction on two sides of the vibration isolation object, and are fixedly connected to the mounting base through a Y-direction mounting column.

11. The multi-dimensional magnetic negative-stiffness mechanism according to claim 2, wherein the one-dimensional fixed magnets and the one-dimensional moving magnet are all formed by stacking a plurality of magnets, and in the magnets stacked on top of each other, magnetizing directions of adjacent magnets are opposite; and magnetizing directions of magnets on a same layer of two one-dimensional fixed magnets are the same and are opposite to magnetizing directions of magnets on a same layer of the one-dimensional moving magnet.

12. The multi-dimensional magnetic negative-stiffness mechanism according to claim 3, wherein the one-dimensional fixed magnets and the one-dimensional moving magnet are all formed by stacking a plurality of magnets, and in the magnets stacked on top of each other, magnetizing directions of adjacent magnets are opposite; and magnetizing directions of magnets on a same layer of two one-dimensional fixed magnets are the same and are opposite to magnetizing directions of magnets on a same layer of the one-dimensional moving magnet.

* * * * *